United States Patent
Barsi et al.

(10) Patent No.: US 12,439,892 B2
(45) Date of Patent: Oct. 14, 2025

(54) SYSTEMS AND METHODS FOR IDENTIFYING DISEASE CAUSING AGENTS AND INTERVENTIONS BASED ON SAMPLE METADATA AND MOLECULAR SIGNATURES

(71) Applicant: Symphony Diagnostics, Inc., Stateline, NV (US)

(72) Inventors: Julius Barsi, Stateline, NV (US); Arnulf Graf, Stateline, NV (US); Joe Schroeter, Stateline, NV (US)

(73) Assignee: Symphony Diagnositcs, Inc., Stateline, NV (US)

( * ) Notice: Subject to any disclaimer, the term of this patent is extended or adjusted under 35 U.S.C. 154(b) by 0 days.

(21) Appl. No.: 18/768,731

(22) Filed: Jul. 10, 2024

(65) Prior Publication Data

US 2025/0017174 A1 Jan. 16, 2025

Related U.S. Application Data

(60) Provisional application No. 63/512,733, filed on Jul. 10, 2023.

(51) Int. Cl.
| | |
|---|---|
| *A01K 29/00* | (2006.01) |
| *G01N 33/00* | (2006.01) |
| *G06N 20/00* | (2019.01) |
| *G16H 15/00* | (2018.01) |
| *G16H 50/30* | (2018.01) |

(52) U.S. Cl.
CPC .......... *A01K 29/005* (2013.01); *G01N 33/00* (2013.01); *G06N 20/00* (2019.01); *G16H 15/00* (2018.01); *G16H 50/30* (2018.01)

(58) Field of Classification Search
None
See application file for complete search history.

(56) References Cited

U.S. PATENT DOCUMENTS

| | | | |
|---|---|---|---|
| 2012/0122717 A1 | 5/2012 | Satyaraj et al. | |
| 2020/0088579 A1 | 3/2020 | Balas | |

FOREIGN PATENT DOCUMENTS

| | | | |
|---|---|---|---|
| JP | 2018523973 A | 8/2018 | |
| KR | 101995755 B1 | 10/2019 | |
| KR | 20210018333 A | 2/2021 | |
| KR | 20210071821 A | 6/2021 | |
| KR | 20220070895 A | 5/2022 | |

OTHER PUBLICATIONS

Peiffer-Smadja, Nathan, et al. "Machine learning in the clinical microbiology laboratory: has the time come for routine practice ?. " Clinical Microbiology and Infection 26.10 (2020): 1300-1309.*
Cihan, Pnar, Erhan Gokce, and Oya Kalipsiz. "A review of machine learning applications in veterinary field." Kafkas Universitesi Veteriner Fakultesi Dergisi 23.4 (2017).*
Mohsen, Farida, et al. "Artificial intelligence-based methods for fusion of electronic health records and imaging data." Scientific Reports 12.1 (2022): 17981.*
Shortliffe, Edward H., Bruce G. Buchanan, and Edward A. Feigenbaum. "Knowledge engineering for medical decision making: A review of computer-based clinical decision aids." Proceedings of the IEEE 67.9 (1979): 1207-1224.*
Cho Y., et al., "An Overview of Calf Diarrhea—Infectious Etiology, Diagnosis, and Intervention", Journal of Veterinary Science, 2014, vol. 15, No. 1, pp. 1-17, DOI: 10.4142/jvs.2014.15.1.1, Epub Dec. 27, 2013, PMID: 24378583; PMCID: PMC3973752.
Ferreira R.L.U., et al., "Selenium in Human Health and Gut Microflora: Bioavailability of Selenocompounds and Relationship With Diseases", Frontiers in Nutrition, Jun. 4, 2021, vol. 8, Article—685317, 19 pages, DOI: 10.3389/fnut.2021.685317.
International Search Report and Written Opinion for International Application No. PCT/US2024/037367, mailed Dec. 4, 2024, 15 pages.
Peixoto R.S., et al., "Advances in Microbiome Research for Animal Health", Annual Review of Animal Biosciences, Feb. 2021, vol. 9, pp. 289-311, DOI: 10.1146/annurev-animal-091020-075907, Epub Dec. 14, 2020, PMID: 33317323.
Rybak B., et al., "Antibiotic Resistance, Virulence, and Phylogenetic Analysis of *Escherichia coli* Strains Isolated from Free-living Birds in Human Habitats", PLoS One, Jan. 12, 2022, vol. 17, No. 1, e0262236, 20 Pages, DOI: 10.1371/journal.pone.0262236, PMID: 35020771, PMCID: PMC8754294.

* cited by examiner

*Primary Examiner* — G. Steven Vanni
(74) *Attorney, Agent, or Firm* — Casimir Jones, S.C.; David A. Casimir

(57) ABSTRACT

Provided herein are systems and methods for animal health assessment, surveillance, and enhancement. For example, provided here are systems, devices, and processes that collect and analyze, in an efficient and high-throughput manner, biological information, environmental information, and demographic information about animal subjects to detect, identify, predict, and/or surveil adverse-health-causative or-associated agents, such as pathogens, and to select and identify suitable interventions.

33 Claims, 6 Drawing Sheets

SYSTEMS AND METHODS FOR IDENTIFYING DISEASE CAUSING AGENTS AND INTERVENTIONS BASED ON SAMPLE METADATA AND MOLECULAR SIGNATURES

CROSS-REFERENCE TO RELATED APPLICATIONS

The present application claims priority to U.S. Provisional Patent Application Ser. No. 63/512,733, filed Jul. 10, 2023, the disclosure of which is herein incorporated by reference in its entirety.

FIELD

Provided herein are systems and methods for animal health assessment, surveillance, and enhancement. For example, provided here are systems, devices, and processes that collect and analyze, in an efficient and high-throughput manner, biological information, environmental information, and demographic information about animal subjects to detect, identify, predict, and/or surveil adverse-health-causative or-associated agents, such as pathogens, and to select and identify suitable interventions.

BACKGROUND

Addressing animal health is of importance to human groups wishing to prevent spread of pathogens to humans, secure stable food resources, and devise early interventions tackling both. Successful management of animal health also protects agricultural investments and is a significant factor in overall economic welfare. The most common sources of disease in animals are the surrounding animal and human populations, as well as animal feed. The causative agents are mostly pathogenic microorganisms, but can also involve non-living environmental conditions, such as toxic chemicals or inadequate diet. Significant research has been conducted on focused areas within this broader landscape: on specific pathogens, specific animals, specific medications, and the like. Yet what is lacking in the field is any systemic approach for efficiently evaluating and identifying harmful agents in a manner that allows productive, early intervention or prevention.

SUMMARY

Provided herein are systems and methods for animal health assessment, surveillance, and enhancement. For example, provided here are systems, devices, and processes that collect and analyze, in an efficient and high-throughput manner, biological information, environmental information, and demographic information about animal subjects to detect, identify, predict, and/or surveil adverse-health-causative or-associated agents, such as pathogens, and to select and identify suitable interventions. For example, provided herein are systems and methods for the discovery, detection, characterization, actionable intelligence derivation, and automatic reporting of pathogens, susceptibility to pathogens, and related animal health matters. In some embodiments, the systems and methods herein provide an interface between molecular biology and machine learning in a manner that permits automation of deriving information related to pathogenic burden from biological samples.

In many important aspects, animal health is determined by the composition of pathogenic and commensal microorganisms within the animal and the animal's immediate surroundings. The detailed knowledge of microbial communities within and around the animal host can be projected toward the animal treatment, risk assessment, and prevention of spread and intervention planning, if many relevant microorganisms are assayed at the same time and analyzed together with sample metadata.

In some embodiments, provided herein are systems and methods comprising one or more or all of: one or more assay kits (e.g., for the collection and analysis of one or more biological samples from one or more animals); hardware (e.g., for processing and analyzing biological samples and collecting data); databases (e.g., intelligent databases containing collected data from processed and analyzed samples, sample metadata, and, optionally, other data, such as historical data); and an artificial intelligence and machine learning (AI/ML) system (e.g., for automatic assay design based on genomic sequence of desired diagnostic targets; for automatic establishment of rubrics by which to interpret said assay; for automatic and real-time analytical interrogation of all data; leveraging generative artificial intelligence to generate "actionable intelligence reports" from proprietary ML models). In some embodiments, these components are assembled together into an automated platform. These systems and methods transform biological animal samples, or molecules derived therefrom, into actionable intelligence that finds use, for example, for veterinary/healthcare, government, science and industry use, with minimum human intervention.

In some embodiments, the systems and methods utilize the composition of the microorganisms associated with an animal, either directly (e.g., pathogenic viruses, bacteria, parasites, and fungi) or indirectly (e.g., nutrition and toxic compounds are known to influence the composition of commensal microorganisms). In some embodiments, microorganisms are distinguished at the level of genomic sequence. Therefore, in some embodiments, to address the health of an animal, the following steps are employed: (1) sample the DNA/RNA of microorganisms associated with a sample; (2) understand their role in the disease and host susceptibility, and (3) project the implications of what has been assayed on: (a) the individual animal associated with the sample, and its immediate surroundings, and (b) the larger population (animal and human), with the extent of reach commensurate to the level threat.

In some embodiments, the systems and methods find use to index the world's infectious diseases and leverage this knowledge to protect animal and public health at the local and large-scale levels.

In some embodiments, the systems and methods comprise an automated and comprehensive solution that discovers, identifies, and distinguishes pathogens of concern to animal and human health science, and generates tailored reports projecting the impact on the health of an individual and/or a population. In some embodiments, the systems and methods function as a real-time combinatorial diagnostics tool composed of four components: 1) automated assay design and production of assay kits to evaluate and discover pathogens in animal samples. In some embodiments, the kit is based on multiplexed interrogation of genomic sequences for the purpose of simultaneously detecting and classifying the microorganisms present in the sample as well as those that are undetected or absent; 2) hardware for automatic sample processing and data acquisition; 3) intelligent database based on available and new data; and 4) AI/ML that autonomously designs the assay, manages the database, and also processes its content in task-specific fashions. In some embodiments, the database serves as a highly structured and exhaustive resource through which each sample is placed within a larger context. In some embodiments, the AI/ML finds patterns in pathogenic data for diagnosis and to make predictions. In some embodiments, the AI/ML finds patterns from non-pathogenic agents for diagnosis and to make predictions. In some embodiments, AI autonomously processes and analyzes the data obtained, makes decisions regarding the importance of the information obtained for each sample through automatic and tailored reports with assigned confidence, and curates, updates and redesigns, as needed or beneficial, the assay kits and hardware to optimize their performance. Furthermore, in some embodiments, generative AI creates disease variants and outbreak proposals, risk assessment profiles, susceptibility profiles, and the like. For example, historical and regularly obtained molecular and genomic surveillance data linked to epidemiological data finds use to identify patterns that predict the sources of isolates, describe transmission dynamics, detect the emergence of new strains or variants, and/or detect the reoccurrence or persistence of a strain or variant over time that may indicate a common and ongoing source or preventable risk factor. In some embodiments, one or more additional sets of information are determined or collected and included in the analysis. For example, in some embodiments, antibiotic susceptibility testing (AST) is conducted to determine the effect of antibiotics on the pathogens. AST data is aligned with direct detection of certain genes or gene products associated with resistances, allowing for the identification of best preventative or interventional approaches (e.g., identification of best antimicrobial (e.g., antibiotic, antimycotic) or antiviral agents for use as therapeutics). In some embodiments, the system generates and reports models predicting the source or geographic origin of pathogens. In some embodiments, the system identifies anomalous patterns that may signify an emergence, re-emergence, or persistence of strains over time. One distinctive role played by AI/ML, is the ability to identify tangential opportunities of importance to the health sector and generate "derivative" deliverables of value (e.g., catalog epitopes with the potential to serve as an mRNA-based vaccine, identify gastro-intestinal microbial communities capable of influencing oncogenic prognosis, etc.).

While each of these components represents an innovative approach to their respective roles, together they derive knowledge from the animal sample that cannot be achieved currently through any other method. Furthermore, this knowledge can be acquired automatically and in real-time. An example of a sequence by which these components work together to derive this knowledge is outlined in FIG. 1.

Currently, the most sophisticated animal health diagnostics and reporting is offered by NAHLN (National Animal Health Laboratory Network), based on disease-specific panels or individual tests for each animal subfamily or geographic region, whose interpretation hinges on the subsequent veterinary assessment. The panels combine ~4-10 individual tests that are primarily based on: (a) analytical chemistry (e.g., selenium levels in serum or liver, indicating the nutritional status of an animal), (b) biochemistry (e.g., antibody tests, such as ELISA or AGID), (c) cell culture (microorganismal resistance profiles), and (d) targeted interrogation of specific genomic information (via PCR). Any projections that can be derived from the sample are necessarily limited (See Table 1; PI=embodiments of the present invention; NAHLH=NAHLH methodologies). To illustrate the differences between the most sophisticated panels currently on market and embodiments of the technology provided herein, we can use as an example the Diagnostic Plan from Cornell University Animal Health Diagnostics Center, addressing Adult Acute Bovine Diarrhea. This plan includes a total of 8 tests, performed on 8samples in a span of 2-10 days and evaluates 4 pathogens using PCR and antigen assays and one environmental factor (selenium). Actionable Intelligence is minimal, consisting of coronavirus beta information for other species, general description of Johne's disease (caused by Mycobacterium avium paratuberculosis) and a list of distinct species for each test that can be tested. Use of embodiments of the technology provided herein outperforms this plan in every aspect. Within <24 hrs, 30-50 microorganisms are assayed (from 19 pathogen families, their strains and the most health-relevant variants, as well as the gut microbiome) using a single sample and single test. For the purpose of veterinary aid, the report can be in a form of an "at-glance" section (listing the main pathogens, their zoonotic potential, treatment options and containment info) or a "detail" report, in which also includes all pathogenic strains found in the sample in the order of relative abundance and suggestions for dietary adjustments based on the animal's gut microbiome. Therefore, while the system is not necessarily directly sampling environmental factors (such as selenium), a more comprehensive assessment of animal health is provided by considering gut microbiome, which (through "guilt-by-association") indirectly reflects the total environment in which the animal lives.

TABLE 1

| | | PI | NAHLN |
|---|---|---|---|
| INPUT | Sequence-based raw data | YES | NO |
| | All existing tests can be included | YES | 3-5 max |
| | Different samples from the same animal | YES | Not usual |
| | Extensive sample metadata | YES | NO |
| | Single Assay for Many Pathogens | YES | NO |
| AUTOMATIC ANALYTICS | In-house robotic Sequencing | YES | NO |
| | Automatic sequence assembly | YES | NO |
| | Automatic pathogen & variant ID | YES | Species only |
| | Intelligent Database | YES | NO |
| OUTPUT | Comprehensive pathogen analysis | YES | 3-5 max |
| | Co-infections | YES | Rare |
| | Infection attributes | YES | Single indication |
| REPORT | Medical Practitioner: Actionable Intelligence | YES | NO |
| | Government or International Agency: Surveillance & Response | YES | Limited |
| | Vaccine or Therapeutic Developer: Variants and Efficacy | YES | Rare |
| PREDICTIVE ANALYTICS | Machine-learning modeling | YES | NO |
| | Infer infection outcome beyond data | YES | NO |
| | Population-level conclusions | YES | NO |
| | Real-time sample analysis | YES | NO |
| TANGIBLE OUTCOME | Suggested course of action | YES | NO |
| | Constantly improving Assay | YES | NO |

The most sophisticated current diagnostics related to animal disease seldom leverage genomic sequence. The few instances that do, fail to exploit combinatorial information to derive insight beyond individual tests.

The "disease panels" described in the previous paragraph (or "legacy assays") were designed to address the most likely causative agents for each indication. For example, to address chronic diarrhea in cattle, the existing NAHLN panel was able to resolve the most likely (bacterial, viral, and protozoal) pathogen (Cho and Yoon, J. Vet. Sci., 15 (1): 1-17 (2014)) to the level that was satisfactory for the veterinary to address the basic treatment. However, a recent shift in the world-wide pathogenic burden dramatically changed the landscape, as illustrated by the losses incurred during the recent avian and swine pandemics. The possibility to (a) comprehensively address the pathogenic burden of an animal and thus obtain more granular information in the form of genomic sequence, and (b) utilize AI/ML to derive insights beyond simple "present vs. absent" provides a process to prevent these and future pandemics.

In some embodiments, samples are from non-human animals and the information generated is employed in animal health settings. For example, in some embodiments, the information may be employed in veterinary diagnostic laboratories interested in, for example, agriculture and food animals (e.g., livestock, poultry, porcine), companion animals (e.g., canine, feline), laboratory research animals (e.g., rodents, primates), marine or aquatic animals (e.g., pinnipeds, finfish, shellfish), recreational animals (e.g., equine), wildlife game animals (e.g., deer, elk, boar, water fowl, chiroptera), wildlife conservation animals (e.g., bison, wolf, moose), exotic zoo animals (e.g., camelids, reptiles), and facility and environmental samples. In some embodiments, the information may be employed in point of care diagnostic solutions. In some embodiments, the information may be employed in health surveillance and disease control agencies (e.g., those interested in zoonotic diseases, those interested in the relationship between oncology and the microbial community surrounding the affected organ(s) (e.g., for gastro-intestinal tumors)). In some embodiments, the information may be employed by government or commercial entities to assist in the management of large numbers of animals in complex environments (e.g., fisheries, animal product or food producers, etc.). In some embodiments, the information may be employed by entities that develop, manufacture, supply, or administer animal health related products (e.g., drugs, vaccines, antibiotics, antivirals, nutritional supplements, diagnostics, etc.). The technology finds particular use where the information is needed quickly and/or to facilitate fast responses (e.g., mRNA vaccines) to emerging problems.

In some embodiments, provided herein are methods comprising one or more of each of: a) obtaining an animal sample (e.g., non-human animal sample) and sample metadata associated with the animal sample; b) generating a molecular signature by exposing nucleic acid obtained from the sample to a multiplex assay configured to identify sequence information from a plurality of microorganisms and viruses; and c) analyzing the molecular signature and the sample metadata with an artificial intelligence and machine learning (AI/ML) system to generate a health report.

In some embodiments, the analyzing comprises use of a computer processor running software that manages one or more aspects of the obtaining, generating, and/or analyzing. In some embodiments, the processor controls one or more hardware devices involved in the obtaining, generating, and/or analyzing. In some embodiments, the processor controls an automated liquid handling unit. In some embodiments, the automated liquid handling unit comprises one or more robotic arms and dispensers. In some embodiments, the processor tracks the sample through one or more of the obtaining, generating, and analyzing steps. In some embodiments, the processor tracks one or more of each of: sample acquisition kit request, sample acquisition kit shipment, sample acquisition kit delivery, sample acquisition kit receipt, sample acquisition kit return, sample acquisition kit shipment status, sample storage, sample archiving, sample splitting, sample entry into a processing system, sample status in a processing system, and sample processing completion. In some embodiments, the processor manages quality control through one or more or all of the obtaining, generating, and/or analyzing steps. In some embodiments, the processor collects or receives the sample metadata. In some embodiments, the processor identifies errors during one or more or all of the obtaining, generating, and/or analyzing steps. In some embodiments, the processor guides human intervention to respond to performance issues during one or more or all of the obtaining, generating, and/or analyzing steps.

In some embodiments, the processor collects data derived from the generating step. In some embodiments, the data is nucleic acid sequence data. In some embodiments, the processor further compiles the data. In some embodiments, the processor further organizes the data. In some embodiments, the processor generates a hypercube from sample-derived data points. In some embodiments, the processor automatically performs analytical analysis on the hypercube. In some embodiments, the analyzing comprises inferring relationships between data obtained in the generating step. In some embodiments, the analyzing comprises inferring relationships between data obtained in the generating step and the sample metadata.

In some embodiments, the analyzing comprises automatically generating the health report. In some embodiments, the method further comprises the step of disseminating the health report to a stake holder. In some embodiments, the stake holder is a government health institution. In some embodiments, the stake holder is an entity that develops and/or manufactures therapeutic or preventative agents or processes. In some embodiments, the therapeutic or preventative agents comprise vaccines, antibiotics, antivirals, antimycotics, and the like.

In some embodiments, the processor automatically generates phylogenetic trees for all microorganisms and/or viruses found in the sample, relative to previously known variants of similar microorganisms and viruses. In some embodiments, the processor calculates an RO of all pathogens found in the sample. In some embodiments, the processor catalogs co-infections identified in the sample. In some embodiments, the processor calculates a risk factor for an animal from which the sample originated. In some embodiments, the processor calculates a risk factor for one or more animals in proximity to an animal from which the sample originated. In some embodiments, the risk factor comprises one or more or all of a risk of acquiring disease related signs or symptoms. In some embodiments, the signs or symptoms comprise one or more or all of, reproductive complications, respiratory problems, dysentery, nerve damage, tooth decay, sensory perception deficits, loss of appetite, pain, hair loss, lower or excessive water consumption, abscesses, bleeding, constipation, coughing or sneezing, abnormal skin color, growth retardation, listlessness, excessive salivation, scratching, tumors, anxiety, restlessness, decreases skeletal muscle tone, and limping.

In some embodiments, the processor generates a spatial map of data points and their time derivative.

In some embodiments, the processor estimates efficacy of treatments/therapies or preventatives on newly discovered microorganism or virus variants. In some embodiments, the processor directs the most effective treatments/therapies or preventatives. In some embodiments, the treatment/therapy is an antibiotic or antiviral. In some embodiments, the preventative is a vaccine.

In some embodiments, the processor identifies a region of a microorganism or virus genome that encodes a peptide or nucleic acid that is a target for therapeutic intervention. In some embodiments, the processor identifies markers indicative of genetic manipulation and/or antimicrobial resistance.

In some embodiments, the processor generates a database comprising the molecular signature, the sample metadata, and correlations there between. In some embodiments, the processor generates a database comprising correlations between the molecular signature and/or the sample metadata and data not derived from the sample (e.g., data from public or private databases). In some embodiments, the data not derived from the sample comprises one or more or all of: nucleic acid sequence data, gene expression data, metabolomic data, proteomic data, cell phenotypic data, tissue function data, and organism phenotypic data. In some embodiments, the processor imports, organizes, and ranks data in the database. In some embodiments, the processor uses the AI/ML system to augment the type, quality, and quantity of the sample metadata with data from public and/or private databases. In some embodiments, the processor uses the AI/ML system to optimize the format of the sample metadata to organize it into the format suitable for computational analysis. In some embodiments, the processor uses the AI/ML system to assign mathematical weights to rank the features of interest in the metadata. In some embodiments, the processor utilizes the mathematical weights to generate a health prediction that is provided in the health report. In some embodiments, the health prediction comprises one or more or all of: pathogen discovery, pathogen identity (e.g., including identification of novel pathogens known to be present based on sampling of a phylogenetic tree, but not directly assayed for in a multiplex assay), relative abundance of microorganism or virus, coinfection, location within a phylogenetic tree, antibiotic resistance, and presence of toxin encoding genes.

In some embodiments, the processor uses the AI/ML system to identify or predict improvements in the obtaining, generating, determining the order, and/or analyzing steps.

In some embodiments, the health report comprises molecular assay designs for further testing of animals. In some embodiments, the molecular assay designs comprise nucleic acid primer and/or probe designs. In some embodiments, the primer and/or probe designs comprise multiplex nucleic acid amplification primer designs.

In some embodiments, the animal sample is from a farm animal. In some embodiments, the farm animal is selected from the group consisting of dairy cattle, sheep, horses, goats, chickens, pigs, rabbits, deer, turkeys, mules, banteng, boars, bison, beef cattle, emu, donkeys, geese, camels, reindeer, pheasants, ducks, quails, domestic yaks, llamas, American pygmies, alpacas, ostrich, elk, and fish. In some embodiments, the animal is a companion animal. In some embodiments, the companion animal is a dog, cat, horse, rabbit, ferret, bird, guinea pig, fish turtle, snake, or lizard. In some embodiments, the animal is a wild animal. In some embodiments, the wild animal is a lion, tiger, leopard, cheetah, jaguar, elephant, giraffe, hippopotamus, rhinoceros, gorilla, chimpanzee, orangutan, bear, wolf, coyote, fox, lynx, bobcat, mountain lion, zebra, wildebeest, gazelle, antelope, warthog, hyena, jackal, crocodile, alligator, turtle, snake, kangaroo, koala, wombat, wallaby, platypus, octopus, squid, crab, lobster, shrimp, clam, oyster, snail, walrus, seal, whale, dolphin, manatee, skink, lizard, gecko, chameleon, bat, raccoon, opossum, rat, mouse, chipmunk, rabbit, badger, skunk, armadillo, porcupine, beaver, otter, seagull, eagle, flacon, hawk, osprey, vulture, owl, parrot, heron, swan, goose, duck, ostrich, turkey, emu, camel, llama, yak, deer, moose, caribou, bison, buffalo, or elk. In some embodiments, the animal is an aquatic animal. In some embodiments, the aquatic animal is a carp, pollock, clam, tilapia, shrimp, tuna, anchovy, salmon, herring, mackerel, rohu, cod, squid, trout, crab, sardine, haddock, catfish, eel, scallop, prawn, shark, perch, albacore, or bass. In some embodiments, the animal is an endangered or threatened species.

In some embodiments, the sample metadata comprises demographic information. In some embodiments, the demographic information comprises age, birth date, number of siblings, gender, species, sub-species, breed, coloring, weight, birth weight, height, and length. In some embodiments, the sample metadata comprises health information. In some embodiments, the health information comprises: disease history, vaccination status, medication history, antibiotic history, pregnancy history, allergies, injury history, behavioral abnormalities, medical test history, medical procedure history, diet (e.g., food ingested), nutritional supplement history, and growth history. In some embodiments, the sample metadata comprises environmental information. In some embodiments, the environmental information comprises: present geography, historical geography, air quality, water quality, soil quality, presence of same-species animals, density of same-species animals, presence of different-species animals, weather, exposure to disease vectors, proximity to disease vectors, exposure to radiation, time spent outdoors, time spent indoors, feeding conditions (e.g., food consumed), geographic history, forest coverage, fertilizer exposure, sewage conditions, exposure to emissions (e.g., sulfur dioxide), and slaughter conditions.

In some embodiments, the multiplex assay is conducted in a single reaction volume. In some embodiments, multiplex assay detects at least 5 different biological targets (e.g., at least 10, at least 20, 10-100, 10-50, 20-50, 30-50, etc).

In some embodiments, the multiplex assay comprises a nucleic acid sequencing reaction. In some embodiments, the nucleic acid sequencing reaction comprises a nanopore sequencing reaction (e.g., Oxford Nanopore Technologies). In some embodiments, the nucleic acid sequencing reaction comprises a sequencing-by-synthesis reaction (e.g., Illumina sequencing). In some embodiments, the nucleic acid sequencing reaction comprises single-read, flow-based data, where sequencing is achieved by flowing one nucleotide at a time in order, iteratively (e.g., Ultima genomics).

In some embodiments, the generating a molecular signature step is automated. In some embodiments, the generating a molecular signature step comprises: i) isolating nucleic acid from the sample; and ii) sequencing the isolated nucleic acid. In some embodiments, the method further comprises amplifying the nucleic acid prior to the sequencing. In some embodiments, the molecular signature comprises sequences from one or more microorganisms and/or viruses present in the sample. In some embodiments, the sequences comprise one or more antibiotic resistance biomarkers.

In some embodiments, the plurality of microorganisms and viruses comprise one or more pathogenic microorganisms and/or viruses. In some embodiments, the one or more microorganisms comprises one or more non-pathogenic microorganisms. In some embodiments, the one or more non-pathogenic microorganisms comprises one or more endogenous symbiotic microorganisms. In some embodiments, the one or more endogenous symbiotic microorganisms comprises one or more gut flora microorganisms.

In some embodiments, the plurality of microorganisms comprises a combination of viruses, prions, bacteria, fungi, or any combination thereof. The granularity for each is also scalable, ranging from the identification of an entire genus or family, all the way to the discovery of an emergent variant that lies beyond the sub-species designation. The list which follows exemplifies some of the most typical organisms in question. However, the technology extends far beyond these examples, effectively addressing a vast array of pathogens.

- Actinobacillus
- Adenoviridae
- Aeromonas Hydrophila
- Ajellomycetaceae
- Aliivibrio Fischeri
- Alphaflexiviridae
- Amalgaviridae
- Anthrax Bacterium
- Arteriviridae (e.g., Equine Arteritis Virus)
- Arthrodermataceae
- Asfarviridae
- Avian Influenza Virus
- Avian Paramyxovirus-1
- Barnaviridae
- Bordetella
- Bordetella Bronchiseptica
- Botourmiaviridae
- Botybimavirus
- Brucella
- Burkholderia Pseudomallei
- Campylobacter
- Campylobacter Jejuni
- Campylobacter Ureolyticus
- Capnocytophaga
- Chlamydophila (e.g., C. Abortus, C. Psittaci, C. Felis)
- Chrysoviridae
- Circoviridae (e.g., Porcine Circovirus Type 2)
- Clonorchis Sinensis
- Clostridium Difficile
- Clostridium Perfringens
- Clostridium Sardiniense
- Coronavirinae (e.g., Coronavirus, Infectious Bronchitis Virus)
- Coxiella
- Coxiella Burnetiid
- Cryptococcaceae
- Deltaflexiviridae
- Endornaviridae
- Enterobacteriaceae
- Enterococcus Durans
- Enterococcus Faecium
- Epstein-Barr Virus (Ebv)
- Equine Influenza Virus
- Escherichia Coli
- Flaviviridae (e.g., Bovine Virus Diarrhea Virus (Bvdv Type 1 And 2)
- Francisella Tularensis
- Fusobacterium Nucleatum (F. Nucleatum)
- Gammaflexiviridae
- Genomoviridae
- Helicobacter Pylori (H. Pylori)
- Hepatitis B Virus (Hbv)
- Hepatitis C Virus (Hcv)
- Herpesviridae (e.g., Bovine Herpesvirus-1, Bhv-1, Equine Herpesvirus-1,-4, And-5, Infectious Laryngotracheitis Virus, Pigeon Herpesvirus)
- Histophilus Somni
- Human Immunodeficiency Virus (Hiv)
- Human Papillomavirus (Hpv)
- Human T-Lymphotropic Virus Type 1 (Htlv-1)
- Hypoviridae
- Kaposi Sarcoma-Associated Herpesvirus (Kshv)
- Lawsonia Spp. (e.g., Lawsonia Intracellularis)
- Leptospira
- Listeria Monocytogenes
- Mammaliicoccus Sciuri
- Mannheimia Haemolytica
- Megabirnaviridae
- Merkel Cell Polyomavirus (Mcpyv)
- Mycobacterium
- Mycobacterium Avium
- Mycoplasma
- Mymonaviridae.
- Narnaviridae
- Neorickettsia Risticii
- Ophiostomataceae
- Opisthorchis Viverrine
- Orthomyxoviridae
- Paeniclostridium Sordellii
- Papillomaviridae
- Paramyxoviridae (e.g., Bovine Parainfluenza Type 3 Virus, Bovine Respiratory Syncytial Virus
- Partitiviridae
- Partitiviridae
- Parvoviridae (e.g., Porcine Parvovirus)
- Pasteurella
- Pasteurella Multocida
- Pediococcus
- Peribunyaviridae (Cache Valley Fever)
- Picornaviridae (e.g., Equine Rhinovirus)
- Polymycoviridae
- Polyomaviridae
- Porphyromonas
- Poxviridae
- Pseudomonas Aeruginosa
- Quadriviridae
- Reoviridae (e.g., Rotavirus)
- Reoviridaem
- Retroviridae (e.g., Small Ruminant Lentivirus)
- Rhabdoviridae
- Rhodococcus Equi
- Rubivirus
- Salmonella
- Salmonella Enterica.
- Schistosoma Haematobium
- Simian Virus 40 (Sv40)
- Sparganosis
- Staphylococcus
- Staphylococcus Caseolyticus
- Staphylococcus Gallinarum
- Staphylococcus Intermedius
- Staphylococcus Kloosii
- Staphylococcus Xylosus
- Streptococcus Dysgalactiae
- Streptococcus Equi
- Streptococcus Zooepidemicus
- Swine Influenza Virus
- Togaviridae (e.g., Eastern Equine Encephalitis Virus)
- Totiviridae
- Trichocomaceae
- Vibrio Alginolyticus
- Vibrio Harveyi
- Yersinia Enterocolitica In some embodiments, the generating a molecular signature further comprises identifying one or more biomarkers associated with a parasite or other disease-causative agent. In some embodiments, the parasite is a protozoa, helminth, ectoparasite. In some embodiments, the other disease-causative agent comprises a prion.

In some embodiments, a disease or condition associated with the microorganism, virus, parasite, or other disease causative agent is acute hepatopancreatic necrosis disease, aflatoxicosis, African swine fever, American foulbrood, akabane, anthrax, Australian bat lyssavirus, avian influenza (bird flu), avian paramyxovirus, bluetongue, botulism, bovine ephemeral fever, bovine tuberculosis, bovine virus diarrhea, brucellosis, brucella ovis, buffalo fly, cache valley fever, campylobacteriosis (vibriosis), caprine arthritis encephalitis (CAE), cattle ticks, classical swine fever, copper deficiency, enzootic bovine leucosis (EBL), epizootic ulcerative syndrome, equine herpesvirus, equine infectious anaemia, equine influenza, equine viral arteritis, fowl cholera, fowl pox, giardiasis, guinea worm disease, hendra virus, infectious laryngotracheitis, influenza, Japanese encephalitis, leishmaniasis, lice, lumpy jaw, malaria, Marek's disease, neospora caninum, Newcastle disease, nipah virus, nosema, ovine brucellosis, pestivirus, pimelea poisoning, porcine reproductive respiratory syndrome (PRRSV), Potomac horse fever, psittacosis (ornithosis), rabies, salmonellosis, schistosomiasis, screw-worm fly, sleeping sickness, spotty liver, strangles, swine fever (classical), swine fever (African), tick fever, toxoplasmosis, transit tetany, transmissible spongiform encephalopathies (TSE), tuberculosis, warts, white-nose syndrome, and/or white spot disease.

In some embodiments, the sample comprises one or more of blood, plasma, serum, buccal swab, bone, teeth, hair, feces, urine, tissue, saliva, semen, sweat, spinal cerebral spinal fluid, culture, scale, shell, feature, mucus, molt, and shedding.

In some embodiments, the AI/ML system is previously trained on sample metadata and molecular signatures. In some embodiments, the sample metadata and molecule signatures are from one or more previously analyzed samples.

In some embodiments, the method further comprises the step of treating an animal from which the sample was derived with a therapeutic agent or preventative.

In some embodiments, the method further comprises the step of treating an animal in proximity to the animal from which the sample was derived with a therapeutic agent or preventative. In some embodiments, the preventative is a vaccine. In some embodiments, the therapeutic agent is an antibiotic, antiviral, or antimycotic. In some embodiments, the therapeutic agent is one or more of: corticosteroids, analgesics (e.g., opioids, non-steroidal anti-inflammatories, etc.), anesthetics and/or tranquilizers (e.g., injectables and inhalants), cardiac/blood pressure modulating agents, antiparasitics, gastrointestinals, muscle relaxants, anti-fungals, hyperadrenocorticism drugs, hypothyroidism and hyperthyroidism drugs, allergy drugs, anaphylaxis drugs, expectorants, barbiturates, and antidepressants.

The technology is not confined to organismal diagnostics. Using the same methods and procedures delineated herein, the platform is capable of recognizing nucleic acid sequence-based signatures that reveal genetic manipulation (e.g. multiple cloning sites, insertion scars such as palindromic sequences associated with laboratory linked transposons, FLIP sites, CRE sites, etc.). Consequently, it finds use to test for GMOs (genetically modified organisms), Multiple-Drug Resistance (endowed by way of plasmid subject to horizontal gene transfer), or a number of other sequence-based features can be seamlessly integrated into any diagnostic assay primarily focused on pathogen identification. Furthermore, ML is leveraged to identify unnatural (e.g., synthetic) sequence patterns that identify genetic manipulation signatures and allow such sequences to be retroactively traced to where they were first encountered or generated.

Also provided herein are systems comprising a processor running software configured to carry out any of the above methods. In some embodiments, the system is configured to carry out each of any of the methods described herein. In some embodiments, the system is configured to carry out each of the steps of any of the methods described herein, concomitantly and in real-time. In some embodiments, the system is configured to carry out each of the steps of any of the methods described above, sequentially, both off-line and online in real-time. In some embodiments, the system comprises a sample processing component. In some embodiments, the system comprises a sample analysis component. In some embodiments, the sample analysis component comprises an automated nucleic acid sequencing component.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the term "treat," "treating" or "treatment" are each used interchangeably herein to describe reversing, alleviating, or inhibiting the progress of a disease and/or injury, or one or more symptoms of such disease, to which such term applies. Depending on the condition of the subject, the term also refers to preventing a disease, and includes preventing the onset of a disease, or preventing the symptoms associated with a disease (e.g., bacterial or viral infection). A treatment may be either performed in an acute or chronic way. The term also refers to reducing the severity of a disease or symptoms associated with such disease prior to affliction with the disease. Such prevention or reduction of the severity of a disease prior to affliction refers to administration of a treatment to a subject that is not at the time of administration afflicted with the disease. "Preventing" also refers to preventing the recurrence of a disease or of one or more symptoms associated with such disease.

As used herein, the term "sample metadata" refers to data associated with a sample that provides information about the sample, but that is not determined from experimental analysis of the sample. For a sample obtained from an animal, sample metadata includes, but is not limited to: geolocation of the animal, food source of the animal, facility details where the animal resides, weather patterns the animal is or was exposed to, animal health concurrent with or prior to the acquisition of a sample from the animal, reproductive status or history, the nature or identity of kits, assays, techniques, instrument, or reagents used to analyze samples, and the like.

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or "processor." Thus, in some embodiments, the methods and systems of the present invention may be performed by a computer or computing device having a processor based on instructions received by computer applications and software.

The term "electronic computer device" as used herein, is a type of computer comprising circuitry and configured to generally perform functions such as recording and analyzing data; generating, formatting, and analyzing databases; generating reports; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device".

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications. Non-transitory computer readable media includes all computer readable media, with the sole exception being a transitory, propagating signal per se.

As used herein the term "data network" or "network" shall mean an infrastructure capable of connecting two or more computers such as client devices either using wires or wirelessly allowing them to transmit and receive data. Non-limiting examples of data networks may include the Internet or wireless networks which may include Wi-Fi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, a Zigby network, or a voice-over-IP (VOIP) network.

As used herein, the term "database" shall generally mean a digital collection of data or information. For the purposes of the present disclosure, a database may be stored on a remote server and accessed by a client device (e.g., through the Internet) or alternatively in some embodiments the database may be stored on the client device or remote computer itself.

As used herein, the term "artificial intelligence" shall generally mean smart machines capable of performing tasks that typically require human-like intelligence and the machines learning from experience, adjusting to new inputs, processing large amounts of data, and recognizing patterns in the data.

As used herein, the term "machine learning" shall generally mean smart machines using statistics to find patterns in large amounts of data, wherein the data is anything that can be digitally stored. Machine learning is seen as a subset of artificial intelligence, and machine learning algorithms make predictions based on data without being programmed to specifically do SO.

As used herein, the term "deep learning" is a subset of machine learning that uses artificial neural networks with a large number of hidden layers. Such networks were designed to simulate brain-like processing of complex information, for example, to progressively extract higher level features from raw data input. These networks can comprise convolutional as well as recurrent networks.

The term "isolated" when used in relation to a nucleic acid, as in "an isolated oligonucleotide" refers to a nucleic acid sequence that is identified and separated from at least one contaminant nucleic acid with which it is ordinarily associated in its natural source. Isolated nucleic acid is present in a form or setting that is different from that in which it is found in nature. In contrast, non-isolated nucleic acids, such as DNA and RNA, are found in the state they exist in nature. Examples of non-isolated nucleic acids include a given DNA sequence (e.g., a gene) found on the host cell chromosome in proximity to neighboring genes; RNA sequences, such as a specific mRNA sequence encoding a specific protein, found in the cell as a mixture with numerous other mRNAs which encode a multitude of proteins. However, isolated nucleic acid encoding a particular protein includes, by way of example, such nucleic acid in cells ordinarily expressing the protein, where the nucleic acid is in a chromosomal location different from that of natural cells, or is otherwise flanked by a different nucleic acid sequence than that found in nature. The isolated nucleic acid or oligonucleotide may be present in single-stranded or double-stranded form. When an isolated nucleic acid or oligonucleotide is to be utilized to express a protein, the oligonucleotide will contain at a minimum the sense or coding strand (i.e., the oligonucleotide may be single-stranded), but may contain both the sense and anti-sense strands (i.e., the oligonucleotide may be double-stranded). An isolated nucleic acid may, after isolation from its natural or typical environment, be combined with other nucleic acids or molecules. For example, an isolated nucleic acid may be present in a host cell into which it has been placed, e.g., for heterologous expression.

The term "purified" refers to molecules, either nucleic acid or amino acid sequences that are removed from their natural environment, isolated, or separated. An "isolated nucleic acid sequence" may therefore be a purified nucleic acid sequence. "Substantially purified" molecules are at least 60% free, preferably at least 75% free, and more preferably at least 90% free from other components with which they are naturally associated. As used herein, the terms "purified" or "to purify" also refer to the removal of contaminants from a sample. The removal of contaminating proteins results in an increase in the percent of polypeptide or nucleic acid of interest in the sample. In another example, recombinant polypeptides are expressed in plant, bacterial, yeast, or mammalian host cells and the polypeptides are purified by the removal of host cell proteins; the percent of recombinant polypeptides is thereby increased in the sample.

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., buffers, written instructions for performing the assay etc.) from one location to another. For example, kits include one or more enclosures (e.g., boxes) containing the relevant reaction reagents and/or supporting materials. As used herein, the term "fragmented kit" refers to delivery systems comprising two or more separate containers that each contain a subportion of the total kit components. The containers may be delivered to the intended recipient together or separately. For example, a first container may contain an enzyme for use in an assay, while a second container contains oligonucleotides. The term "fragmented kit" is intended to encompass kits containing Analyte specific reagents (ASR's) regulated under section 520(e) of the Federal Food, Drug, and Cosmetic Act, but are not limited thereto. Indeed, any delivery system comprising two or more separate containers that each contains a subportion of the total kit components are included in the term "fragmented kit." In contrast, a "combined kit" refers to a delivery system containing all of the components of a reaction assay in a single container (e.g., in a single box housing each of the desired components). The term "kit" includes both fragmented and combined kits.

DETAILED DESCRIPTION

Figure 1A:
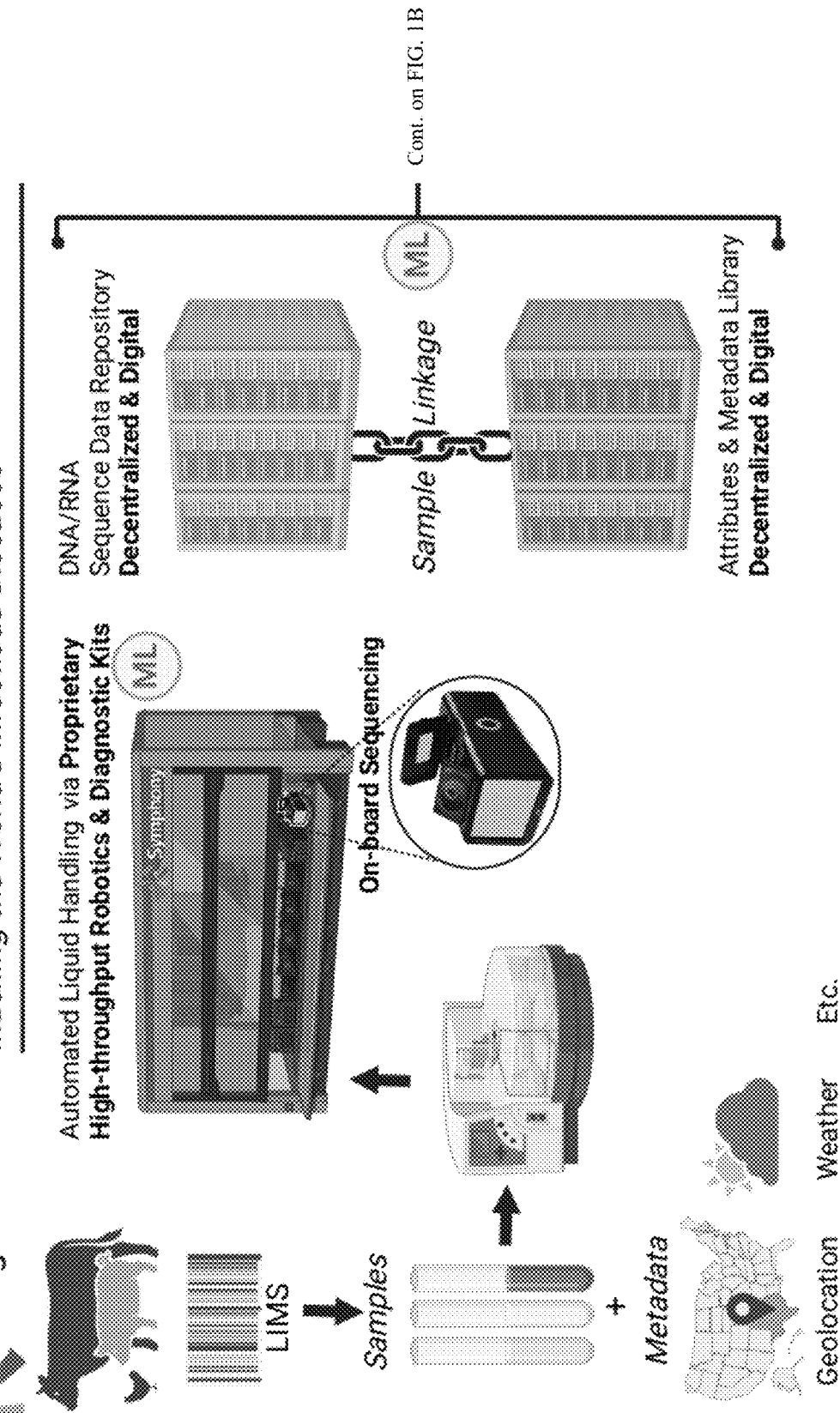
FIGS. 1A-B show an exemplary flowchart of embodiments of the systems and methods described herein. From left to right: Samples derived from animals, such as agricultural (e.g., livestock, poultry, porcine), companion (e.g., canine, feline), lab (e.g., rodents, primates), recreational (e.g., equine), wildlife game & conservation (e.g., deer, elk, boar, water fowl, bison, wolf), as well as facility/environmental samples are processed and nucleic acid sequences obtained through automated liquid handling using high-throughput robotics and diagnostic kits, including on-board sequencing. At the same time, sample metadata (e.g., geo-location, food source, facility details, weather patterns, animal health, and reproductive status, etc.) is collected and processed through a Lab Information Management System (LIMS). Each sample then serves as a link between a DNA/RNA Sequence Data Repository and Decentralized and Digital Attribute & Metadata Library, which, together create an Intelligent Database. A purpose of the Intelligent Database is to analyze data/metadata from the individual sample within a larger context and also integrate all new information from the sample for future use. Automation and updates of the liquid handling system, kit, and Intelligent Database are managed via ML. The data from the sample is then autonomously processed by ML/AI software: ML derives comprehensive diagnostics via 100% automated analytics (e.g., pathogen species and variant ID and its position with the phylogenetic tree, its novelty and associated novel genomic sequence, transmission rate, treatments and resistance profile, markers of GMO origin and toxin presence, etc.). AI then computes outcome, together with its confidence level using predictive modeling. ML sub-selects the output and generates an actionable intelligence report, tailored for each "customer." For federal departments and agencies performing surveillance (e.g., CDC, USDA, FDA), this report can include information including the changes of spread, isolation protocols, population impact and the likely source of the infection/pathogen, among others. For treatment purposes, catering to the veterinary diagnostics field, such as the National Animal Health Lab Network (NAHLN), the report can include information that identifies co-infections and suggests the most effective treatment regime while considering the animal status and resistance for all infectious agents (e.g., antimicrobial resistance, antiviral resistance, etc.). For the purpose of rapid countermeasure discovery and development (e.g., vaccines, antimicrobials, etc.), the report can identify information including novel variant sequences and assess the efficacy of existing vaccines against the new variants as well as providing guidance for the selection of new prophylactic or treatment options.

The present disclosure provides automated systems and methods related to animal epidemiological systems. In particular, the present disclosure provides systems and methods to collect, prepare, input, process, and store animal health data (e.g., biological, environmental, and behavioral) and couple the data to a disease modeling system (e.g., machine learning, artificial intelligence). As provided herein, the automated methods find use to evaluate the current and future health of the individual animal, its immediate surroundings, and the larger animal population, which supports systems for decision making (e.g., diagnosis, resource allocation, treatment, etc.) and reduces the time needed to surveil, detect, and treat animal populations.

In some embodiments, a component of the systems and methods are assay kits that facilitate the collection of biological data from samples collected from one or more animals. In some embodiments, the assay kits comprise multiplex reaction devices (e.g., multi-well plates) and reagents (e.g., a cocktail of oligonucleotides that function as multiplex PCR primer-pairs capable of amplifying a portion nucleic acid from multiple microorganisms or viruses). In some embodiments, samples undergo a processing and pre-purification step prior to nucleic acid amplification. For example, in some embodiments, samples may undergo cellular lysis, dilution, or concentration. In some embodiments, nucleic acid is purified way from non-nucleic acid components of the sample, by, for example, capture, centrifugation, filtration, or the like. Target sequences in the nucleic acid may be amplified any suitable methodology. Illustrative non-limiting examples of nucleic acid amplification techniques include, but are not limited to, polymerase chain reaction (PCR), TAQMAN amplification, reverse transcription polymerase chain reaction (RT-PCR), transcription-mediated amplification (TMA), ligase chain reaction (LCR), strand displacement amplification (SDA), and nucleic acid sequence-based amplification (NASBA). Those of ordinary skill in the art will recognize that certain amplification techniques (e.g., PCR) typically involve RNA reverse transcription to DNA prior to amplification (e.g., RT-PCR), whereas other amplification techniques directly amplify RNA (e.g., TMA and NASBA).

In some embodiments, the assay kit simultaneously targets known microorganisms and viruses, yet has the capability to discover novel viral, bacterial, fungal, and parasitic pathogens of interest. In some embodiments, the assay kit is composed primarily of multi-well plates, with each well harboring a cocktail of oligonucleotides that function as multiplex PCR primer-pairs capable of amplifying a portion of the genome from multiple microorganisms or viruses. These amplicons are then analyzed (e.g., sequenced using long-read sequencing). In some embodiments, a total of 30-50 primer pairs are employed in the assay kit, optimized to show minimal primer-dimer amplification (unwanted amplicons observed in the absence of a template, resulting from starting a PCR reaction off another primer within the primer mix). While the primers are capable of amplifying a subset of the pathogen genome, the sequence variants within the primer-defined genomic region are identified by later analysis (e.g., sequencing). This is especially relevant to the emerging variants of known strains or antimicrobial resistance/toxin-encoding genes.

In some embodiments, the primer pairs are designed to amplify: 20-30 sequences capable of distinguishing specific pathogenic strains and variants, 5-15 sequences assaying commensal microorganisms, and 5-15 sequences defining the major phylogenetic branches of pathogenic bacteria, viruses, fungi, and parasites identifying the presence of a family of each species at the coarse scale, as well as 2-5 sequences assaying the "resistome" (sequences associated with antimicrobial resistance genes) and toxin-encoding genes. This set of primers can be multiplexed in single reaction vessels. Where additional information is desired, two or more multiplex volumes are employed per sample.

Pathogens: In some embodiments, to address their virulence and subsequent treatment and containment options, pathogens are resolved to the level of strains (Rybak, et al. 2022). Therefore, for each condition, the kit contains 20-30 primer pairs capable of resolving 20-30pathogenic strains of bacteria, viruses, fungi and parasites that are most likely to be associated with each condition. The target sequences (and therefore also the primer pairs) may be constantly revised via optimization methods described herein to reflect the dynamic nature of infectious diseases. For example, diseases such as porcine reproductive and respiratory syndrome (PRRS) involve rapidly mutating virus. Application of the systems and methods provided herein allow for earlier detection of changes, analysis of geographic trends in changes, and more efficient selection and use of optimized assays for detecting variations.

Commensal Microorganisms: The microbiome reflects the overall health of the animal, including the environmental factors otherwise un-assayable through sequencing the DNA. For each sample type (e.g., fecal, buccal, urine), 5-15 of the microorganisms most indicative of a balanced corresponding microbiome are included in the assay (see e.g., Peixoto, et al. 2021). ML/AI plays an important role in revising this list based on correlation of known disease-inducing environmental factors to the sampled and published microbiome.

Major Phylogenetic Branches: The purpose of including sequences shared by multiple strains is to infer missing information by the use of a phylogenetic tree. For example, if one assays the Mycobacterium family and do not obtain a sequence from the strain present within the multiplex test (e.g., Mycobacterium avium paratuberculosis, causing the very common Johne's disease associated with diarrhea in cattle), the conclusion is that a strain OTHER than M. avium paratuberculosis is present. This allows for AI/ML involvement in re-designing the Kit (discussed below).

Resistome: Primers amplifying antimicrobial resistance (AMR) genes and toxin-encoding genes are included to assess therapeutic options. Many AMR genes can reside within plasmids acquired through the horizontal gene transfer and are therefore a unit of information independent of the pathogen ID. Known and emerging variants of the AMR and toxin genes are assayed using 2-5 primer pairs.

In some embodiments, the systems and methods address "unresolved" cases by use of the approaches described herein. In doing so, resolutions may be utilized to enhance the systems and methods. For example, a sample that resulted in an "unresolved" status in another laboratory is tested using the systems and methods described herein and a novel pathogen or co-infection is identified as relevant. In some embodiments, unresolved samples may be solved by conducting additional experimentation (e.g., use of additional primer pairs, analysis of other metagenomic data, etc.). In some such embodiments, optimized methodologies are employed on a go-forward basis to more readily identify the new solution, where it presents itself. In some embodiments, this may involve adding a new primer pair to a multiplex amplification reaction. In other embodiments, it may involve data analysis.

In some embodiments, the AI/ML components of the system are employed to update assay kit configurations. For example, the kits may be updated to reflect current pandemics. Designing novel oligonucleotides based on field reports of emerging infectious diseases is important for surveillance and countermeasure (e.g., vaccine) discovery and development. Thus, each emerging variant is evaluated for its significance to animal and public health, and those variants estimated to have the potential for high penetrance and pathogenicity are flagged. For each such variant, the system: (a) ascertains a sequence that distinguishes it from other (existing) variants (whether or not they are currently included in the kit), (b) designs multiple primer sets to be evaluated for their performance within the existing kit, and (c) beta-tests these new sets within the kit on new samples. The overall assay kit design allows for immediate incorporation of the primer pairs for emerging variants without the need to test each newly added set exhaustively, precisely because of the use of rapidly scalable and deployable ML solutions utilizing ML algorithms that can be rapidly re-trained, which allows for identification of any potential problems, due to learning on a large collection of data generated with the initial primer set.

In some embodiments, the AI/ML components of the system are employed to amend poor-performance mixes to continuously improve (amend by addition, deletion or replacement of custom oligonucleotides) upon the original multiplex PCR assay, through analysis of the resulting sequences and overall kit performance, allowed by AI/ML involvement described herein.

In some embodiments, a component of the systems and methods is hardware. In some embodiments, the hardware comprises automated sample and liquid handling components that orchestrate processing of collected samples through optional sample pre-purification steps, through assay kit sample processing, and through nucleic acid analysis and data collection. For the latter, in some embodiments, the systems and methods comprise a nucleic acid sequencer that determines target sequences from the amplified nucleic acids generated by the assay kits. Nucleic acid may be analyzed using a variety of techniques including but not limited to: nucleic acid sequencing, nucleic acid hybridization, nucleic acid amplification, and mass spectroscopy. The description herein focuses on sequencing to illustrate embodiments of the invention. Suitable nucleic acid sequencing techniques include, but are not limited to, sequencing by synthesis (see e.g., Meyer and Kircher, "Illumina sequencing library preparation for highly multiplexed target capture and sequencing," Cold Spring Harbor Protocols 2010 (6)); single-molecule real-time sequencing (see e.g., Levene et al., "Zero-Mode Waveguides for Single-Molecule Analysis at High Concentrations," Science. 299 (5607): 682-6 (2003)); ion semiconductor sequencing (see e.g., Rusk, "Torrents of sequence," Nat. Methods 8, 44 (2011)); pyrosequencing (see e.g., Wicker et al., "454 sequencing put to the test using the complex genome of barley," BMC Genomics, 7:275, 2006); sequencing by ligation (SOLID sequencing) (see e.g., Margulies et al., "Genome sequencing in microfabricated high-density picolitre reactors," Nature, 437:376-80 (2005)); nanopore sequencing (see e.g., Goodwin et al., "Oxford Nanopore sequencing, hybrid error correction, and de novo assembly of a eukaryotic genome," Genome Res., 25 (11): 1750-6 (2015)); chain termination sequencing (Sanger sequencing) (see e.g., Sanger et al., "DNA sequencing with chain-terminating inhibitors," Proceedings of the National Academy of Sciences of the United States of America, 74 (12): 5463-5467 (1977)); and sequencing with mass spectrometry (see e.g., Edwards et al., "Mass-spectrometry DNA sequencing," Mutation Research, 573 (1-2): 3-12 (2005)). The use of Oxford Nanopore Technology allows for the obtaining of >10 kb uninterrupted sequences-enough to resolve whole plasmids (harboring antimicrobial resistance genes) and the phylogenetic relationship of new emerging variants of microorganisms or viruses relative to existing ones circulating through the population.

In some embodiments, AI/ML is leveraged to optimize robotic sample and liquid handling according to sample input and to track the progress of each sample. For instance, computer vision is used to optimize the sample and liquid handling of the robot, and track the evolution of each biological sample.

In some embodiments, the technology described herein is associated with a programmable machine designed to perform a sequence of arithmetic or logical operations as provided by the methods described herein. For example, some embodiments of the technology are associated with (e.g., implemented in) computer software and/or computer hardware. In one aspect, the technology relates to a computer comprising a form of memory, an element for performing arithmetic and logical operations, and a processing element (e.g., a microprocessor) for executing a series of instructions (e.g., a method as provided herein) to read, manipulate, and store data. In some embodiments, a microprocessor is part of a system for determining the presence or absence of a sequence in a sample and for confirming that the sequence is genuine and not the result of errors introduced by a biological assay (e.g., nucleic acid amplification) performed on the sample.

In some embodiments, the various embodiments of the present disclosure are associated with a plurality of programmable devices that operate in concert to perform a method as described herein. For example, in some embodiments, a plurality of computers (e.g., connected by a network) may work in parallel to collect and process data, e.g., in an implementation of cluster computing or grid computing or some other distributed computer architecture that relies on complete computers (with onboard CPUs, storage, power supplies, network interfaces, etc.) connected to a network (private, public, or the internet) by a conventional network interface, such as Ethernet, fiber optic, or by a wireless network technology.

For example, some embodiments provide a computer that includes a computer-readable medium. The embodiment includes a random access memory (RAM) coupled to a processor. The processor executes computer-executable program instructions stored in memory. Such processors may include a microprocessor, an ASIC, a state machine, or other processor, and can be any of a number of computer processors, such as processors from Intel Corporation of Santa Clara, California and Motorola Corporation of Schaumburg, Illinois. Such processors include, or may be in communication with, media, for example computer-readable media, which stores instructions that, when executed by the processor, cause the processor to perform the steps described herein.

Computers are connected in some embodiments to a network. Computers may also include a number of external or internal devices such as a mouse, a CD-ROM, DVD, a keyboard, a display, or other input or output devices. Examples of computers are personal computers, digital assistants, personal digital assistants, cellular phones, mobile phones, smart phones, pagers, digital tablets, laptop computers, internet appliances, and other processor-based devices. In general, the computers related to aspects of the technology provided herein may be any type of processor-based platform that operates on any operating system, such as Microsoft Windows, Linux, UNIX, Mac OS X, etc., capable of supporting one or more programs comprising the technology provided herein. Some embodiments comprise a personal computer executing other application programs (e.g., applications). The applications can be contained in memory and can include, for example, a word processing application, a spreadsheet application, an email application, an instant messenger application, a presentation application, an Internet browser application, a calendar/organizer application, and any other application capable of being executed by a client device. All such components, computers, and systems described herein as associated with the technology may be logical or virtual.

In some embodiments, the systems and methods employ system control hardware and software that manages the hardware, that processes and analyzes collected data, and the interprets the data, in combination with sample metadata. In some embodiments, software is run on a computer processor. In some embodiments, the system and system software is multilayered, modular and scalable. In some embodiments, the software manages one or more of the following system operations and features: a) controls an automated liquid handling unit and/or one or more of its auxiliary components; b) tracks samples from beginning to end (e.g., sample acquisition kit request, sample acquisition kit shipment, sample acquisition kit delivery, sample acquisition kit receipt, sample acquisition kit return, sample acquisition kit shipment status, sample storage, sample archiving, sample splitting, sample entry into processing system, sample status in processing system, sample error or anomaly detection, sample data collection, sample processing completion); c) quality control throughout the entire process; d) collect sample metadata associated with each sample; e) identify and flag errors during the process; f) guide human intervention when necessary; g) collect, compile and organize all data (e.g., sequence data); h) generate a hypercube from all sample derived data points; i) automatically perform analytical analysis on the hypercube; j) leverage machine learning for a variety of purposes, including the inference of non-obvious relationships amongst the data; k) automatically generate and disseminate reports bespoke to select stake holders; 1) automatically generate phylogenetic trees for all microorganism and viruses found, relative to previously recorded variants of similar microorganisms and viruses; m) calculate the RO of all pathogens found in a sample; n) catalog co-infections; o) compute a risk factor for the animal from which the sample originated, as well as for animals in its proximity (e.g., risk of dysentery, respiratory problems, pregnancy complications, etc.); p) spatially map all data points and their time derivative; q) estimate the efficacy of existing therapies or preventatives (e.g., vaccines, antibiotics, etc.) on newly discovered variants; r) identify region(s) of a pathogen's genome that encodes a peptide or nucleic acid particularly useful as target for therapeutic intervention (e.g., antigen for vaccine development); and s) recognize markers indicative of genetic manipulation and/or antimicrobial resistance. In some embodiments, the systems and methods perform one or more or all of the above concomitantly and in real-time.

An artificial intelligence system component may comprise or function as artificial intelligence logic stored in memory that may be executable by a processor of one or more servers and/or client devices. In some embodiments, the artificial intelligence component may function as or comprise a machine/deep learning/artificial intelligence platform that interrogates the information or data of the system and learns about trends associated with data obtained from analysis of one or more samples, sample metadata, and information in public or private databases. The artificial intelligence component consistently undergoes algorithm testing and validation based on new data available.

Figure 2:
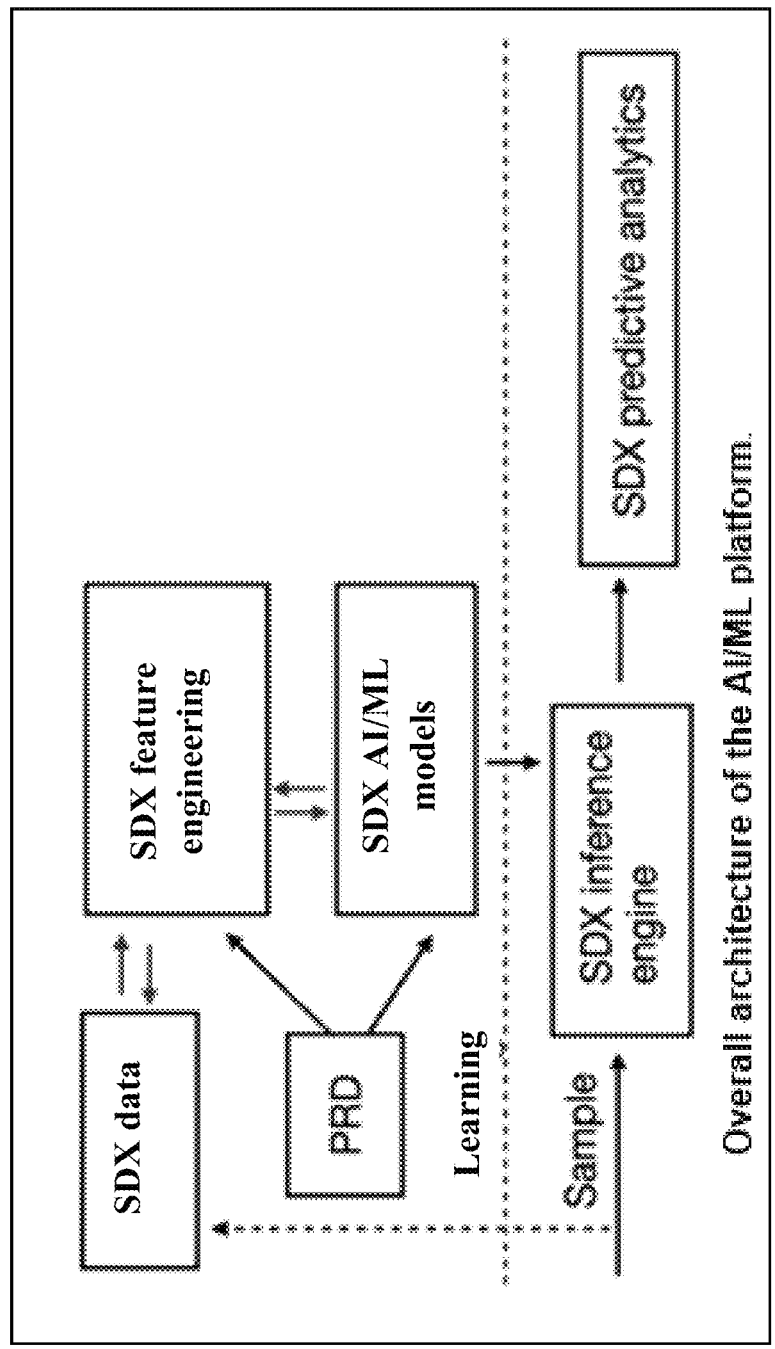
FIG. 2 shows an embodiment of an AI/ML platform that assesses molecular data obtained from a sample with sample metadata.

FIG. 2 shows an embodiment of an AI/ML platform that assesses molecular data obtained from a sample with sample metadata. In some embodiments, the system provides information processing whereby collected molecular information allows detection of known microorganisms and viruses, while retaining the ability to discover new microorganisms and viruses or new variants of known ones. In some embodiments, the AI/ML system automatically performs multidimensional analytics for the purpose of uncovering any hidden and non-obvious relations in the data.

In some embodiments, the systems and methods employ an intelligent database. In some embodiments, the intelligent database is composed of: (a) data, and (b) AI/ML feature extraction. The data and AI/ML feature extraction are in symbiotic relation, and together create the intelligent database. The latter can be task specific, and tailored to a specific product specification sheet. Such intelligent database allows the systems to convert data into knowledge without any need to generate more data. In some embodiments, the systems and methods apply dimensionality reduction to data samples, performed prior to feature engineering and classification. In some embodiments, the systems and methods perform hyperparameter optimization in an automated fashion. In some embodiments, the systems and methods apply class balancing.

In some embodiments, the data repository (database) is created from a digital repository of all contemporary diagnostic data types that are quantitative and relatable to genomic sequence. The database contains data (e.g., samples x features) and for some samples also labels created by humans and/or ML predictions (e.g., self-supervised learning). The data is dynamic, and can therefore be updated offline (batch, e.g., overnight) and/or online (e.g., real-time) as new samples are used for inference and/or as AI/ML generates outputs. AI/ML is used to manage autonomously the data, including the case where the data in the repository comes from sources that may have different data volume, variety, velocity, and veracity. Example of datasets that meet the above criteria include, but are not limited to: (a) Illumina sequence data, (b) Oxford Nanopore Technologies sequence data, (c) all existing formats for archived sequence data (Plain Sequence, FASTQ, EMBL, FASTA, GCG, GenBank, etc.), (d) Nanostring Raw Code Counts (relatable to sequence by complementarity to probes), and (e) Quantitative PCR (relatable to sequence by complementarity to primers).

A number of parameters collectively referred to as sample metadata, are also be included in the data. They provide, for example, geo-location, origin of food sources, species from which sample originated, number of individuals within the herd/flock, etc., weather conditions at the time of sampling, migratory pattern of wild animals, vaccination history, comorbidities, reproductive status, and the like.

AI/ML feature extraction: The purpose of feature extraction is to derive deliverables from the data. An example of a feature is identifying the strain of a pathogen found within the sample through contextual analysis of its sequence, which is compared to the sequences in the repository and their phylogenetic relationship. In some embodiments, the systems and methods use supervised and unsupervised ML to score and subsequently rank the features in the data. In some embodiments, the systems and methods use ensemble learning to boost accuracy of classification in feature selection. In some embodiments, the systems and methods rank features based on how well they account of the variance in characterization using ML models. In some embodiments, the systems and methods further engineer new features ensembles to increase prediction accuracy. In some embodiments, the cost metric is task-dependent, and defined in the Product Requirement Document (PRD). For example, in some embodiments, ranking is done as follows:

i) Individual features with respect to other individual features and/or to other groups of features to rank individual features.

ii) Groups of features with respect to other potentially overlapping groups of features to capture population effects and dependencies. The system also captures potential combinatorial effects between the features in the data.

In some embodiments, generative AI is used to guide feature discovery via real-time feedback on the most critical dimensions for analysis. Some aspects of the intelligent data include: (a) what features in the data or metadata are most important for pathogenic diagnosis, and (b) what are the hidden relationships within the data features both for individual and populations of features. The intelligent data also virtually augments available data in a task driven fashion to target diagnostic goals in healthcare, and can also automate documentation of laboratory and bioinformatic methods used to generate sequence data (e.g., potentially embedded as metadata along with the sequence itself).

Figure 1B:
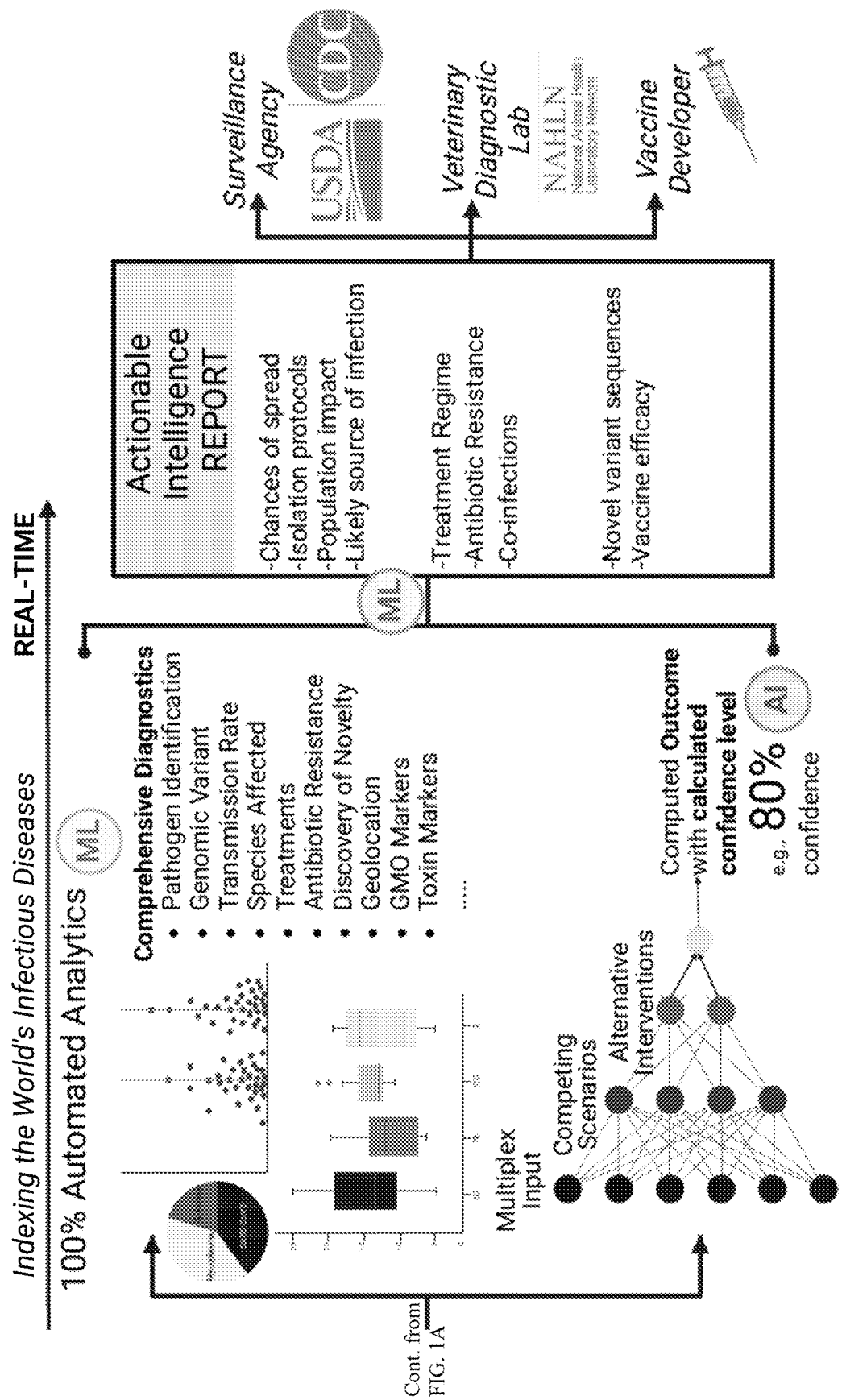

In some embodiments, they systems and methods compute predictive analytics using the AI/ML architecture similar to FIG. 2 and comprising: Model LEARNING, and INFERENCE. In some embodiments, the platform incorporates AI/ML as shown in FIG. 1.

Figure 3:
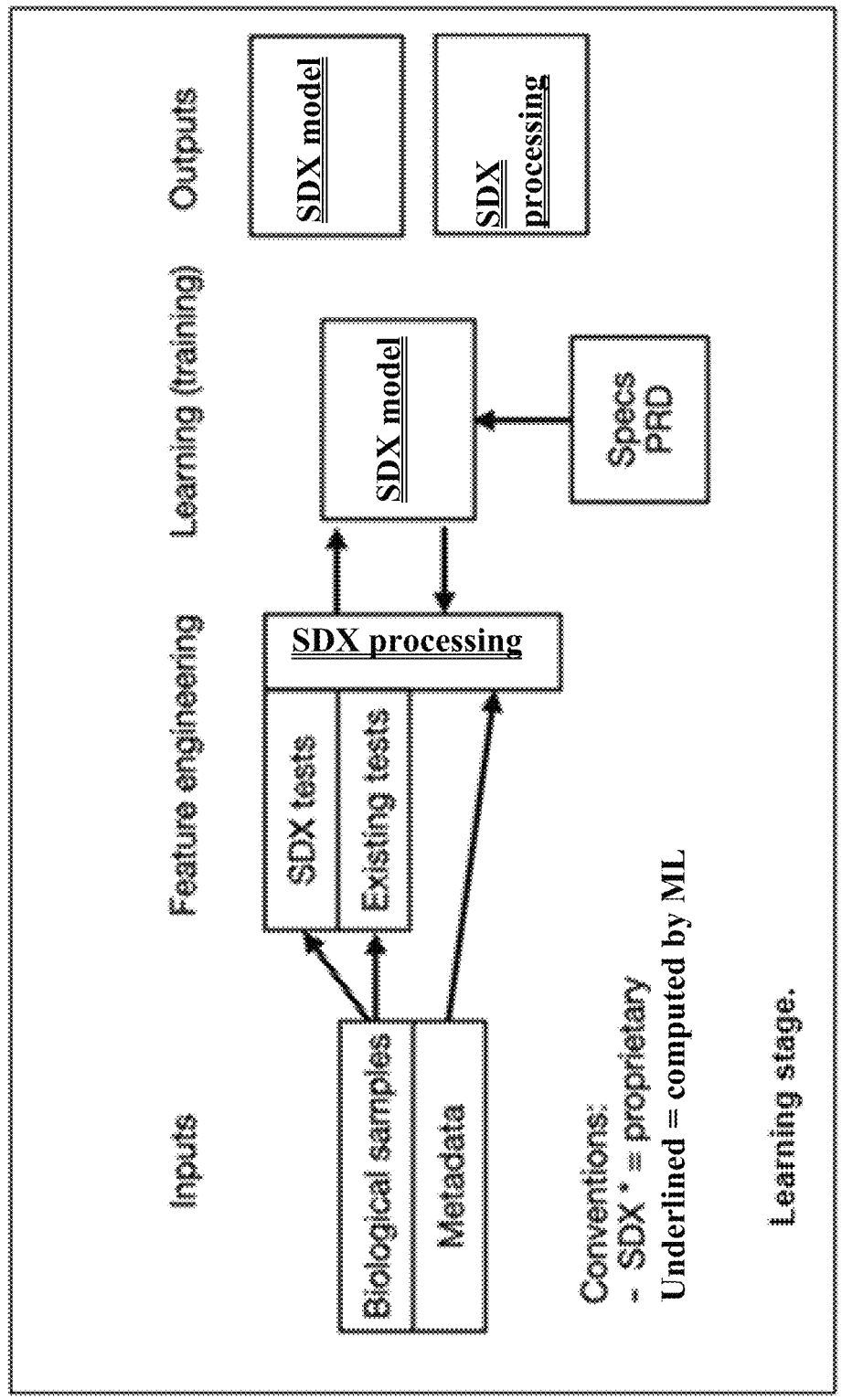
FIG. 3 shows an embodiment of a learning stage of an AI/ML platform.

Model LEARNING: In some embodiments, system AI/ML models (see e.g., FIG. 3) are trained by learning based on: (1) the intelligent data and (2) specifications of the Product Requirements Document (PRD). In some embodiments, the system uses supervised, unsupervised, semi-supervised and self-supervised learning depending on the task. Generative AI may also be used to guide model discovery. The output of this stage is composed of:

i) The preprocessing underlying the feature engineering; and ii) The AI/ML model itself.

Although model learning is computationally heavy and typically run in the cloud, in some embodiments, it is run on premise and/or on device with appropriate hardware architecture.

Figure 4:
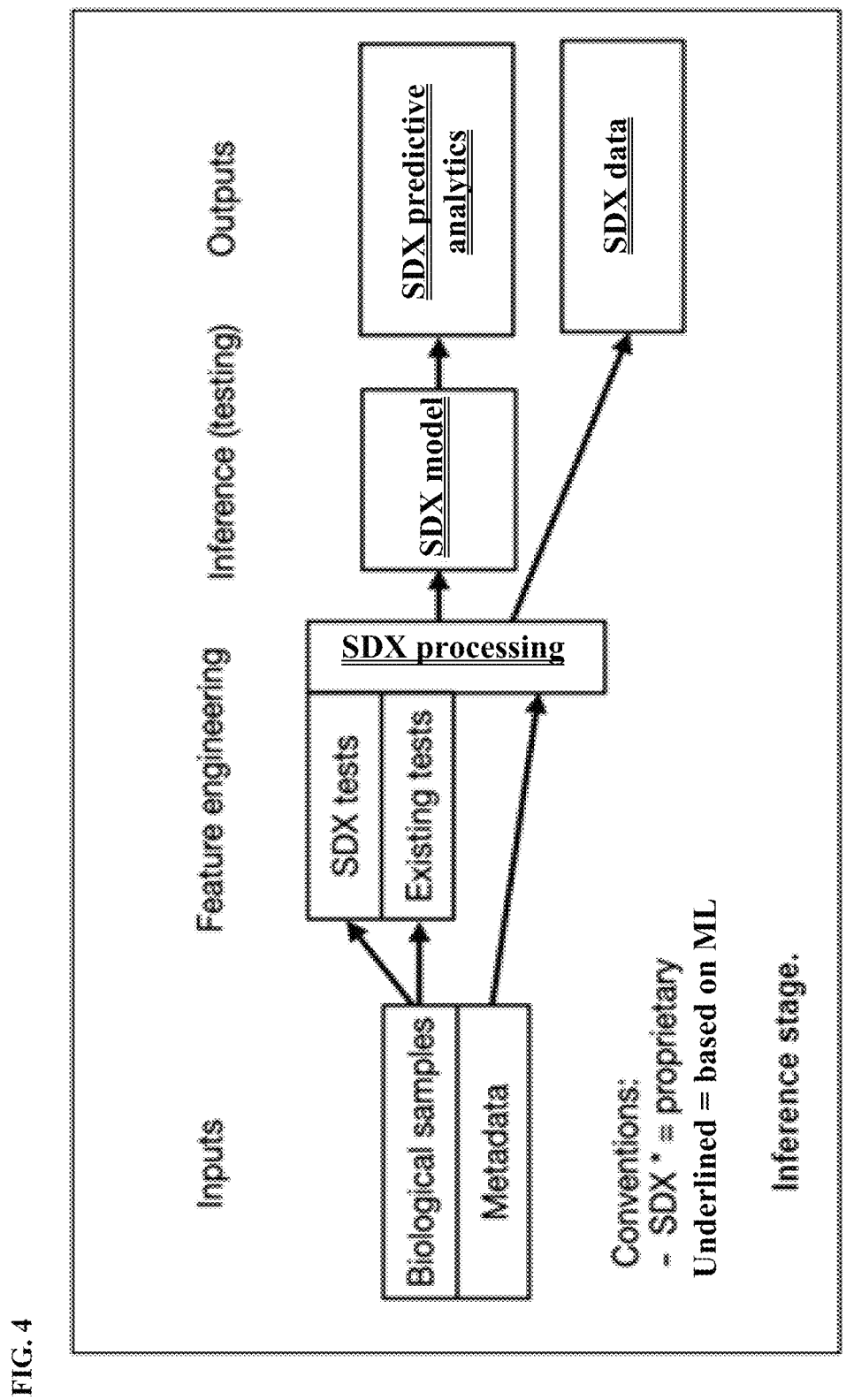
FIG. 4 shows an embodiment of an inference stage of an AI/ML platform.

INFERENCE: In some embodiments, the inference (see e.g., FIG. 4) uses preprocessing and models to get predictive results from test sample data in an automated fashion. The results of the inference can be probabilistic. The predictive analytics can stand on their own and/or be used to augment the intelligent data. Inference is computationally light, and may be used on premise and/or on device.

In some embodiments, the AI/ML component, in addition, is used for one or more or all of: a) to design novel oligonucleotides based on reports of emerging infectious diseases (e.g., generative AI and/or reinforcement learning); b) to predict future disease variations and/or outbreaks (e.g., time series forecasting, generative AI); and c) to predict potential transfer from animals to humans (e.g., transfer learning from a deep neural network, extrapolation from ML models).

In some embodiments, the system leverages AI/ML to inform which parameters in the meta-data are most important for pathogenic diagnosis or health assessment. In particular, the system can identify hidden relationships among the data as in the following 2 examples:

1. ML may identify a unique profile of microorganisms (either through their identity, their relative abundance, or a combination thereof) suggestive of an infected, malnourished, or poisoned animal. This, in turn, the system can imply that: in the case of "infected" (a) the animal is infected below the limits of detention (recently infected), (b) is predisposed to get infected due to compromised immunity; in the case "malnourished" (c) the animal has insufficient intake of particular nutrient or an underlying genetic condition; in the case of "poisoned" (d) the animal has been exposed to environmental toxins. For infected animals, a distinction can be made between transient and persistent infections so that the appropriate interventions can be taken (e.g., culling of persistently infected (PI) animals).

2. ML may rapidly determine that a particular breed is significantly more protected by vaccination than other breeds.

Further examples of predictive analytics that can be automatically performed include: a) genome assembly; b) genome annotation; c) strain identification; d) strain discovery; e) highlighting variants of concern; f) phylogenetic relationship relative to all other known strains; g) ancestral strain from which the new variant most likely arose; h) presence of other strains; i) effectiveness of existing vaccines and/or antibodies; j) R-naught (RO) calculated from known variants; k) putative mutants of concern that arise from said variant; l) geographic origin prediction of strains; m) persistent versus transient infection differentiation; n) vaccine strain versus wildtype differentiation; o) phenotype prediction from genotype data; p) identification of anomalous patterns that may signify the emergence, re-emergence, or persistence of strains over time; q) assessment of proper assay function.

In some embodiments, the predictive analytics are grouped into actionable intelligence reports (See e.g., FIG. 1) that are personalized for the customer as defined in the product specification sheet. These reports may be written as a whole or partly using generative AI, and may be personalized to customer requests using generative AI such as chatbots. In some embodiments, these chatbots are trained to retain history of each customer interaction, and therefore be uniquely personalized (as opposed to current generic chatbots). In some embodiments, the actionable intelligence reports accurately and concisely describe the situation and recommend a particular course of action(s). In some embodiments, AI/ML is used to determine the best recipient of these reports, if not specified in the product specification sheet, or to decide whether multiple agencies receive the aforementioned actionable intelligence report (or a derivative thereof). These reports can be delivered to the following entities: a) contributor receives actionable intelligence report; b) government surveillance bodies receive assembled genome sequence data, geo-location and a vast number of other parameters, etc. all the while respecting the privacy of the contributor; c) entities involved in vaccine development receive genomic data from novel variants in real-time so as to better position themselves to address emerging threats; and d) entities involved in antibiotic, antiviral, and anti-parasitic drug discovery and development receive genomic data from novel variants in real-time so as to better position themselves to address emerging threats.

Figure 5:
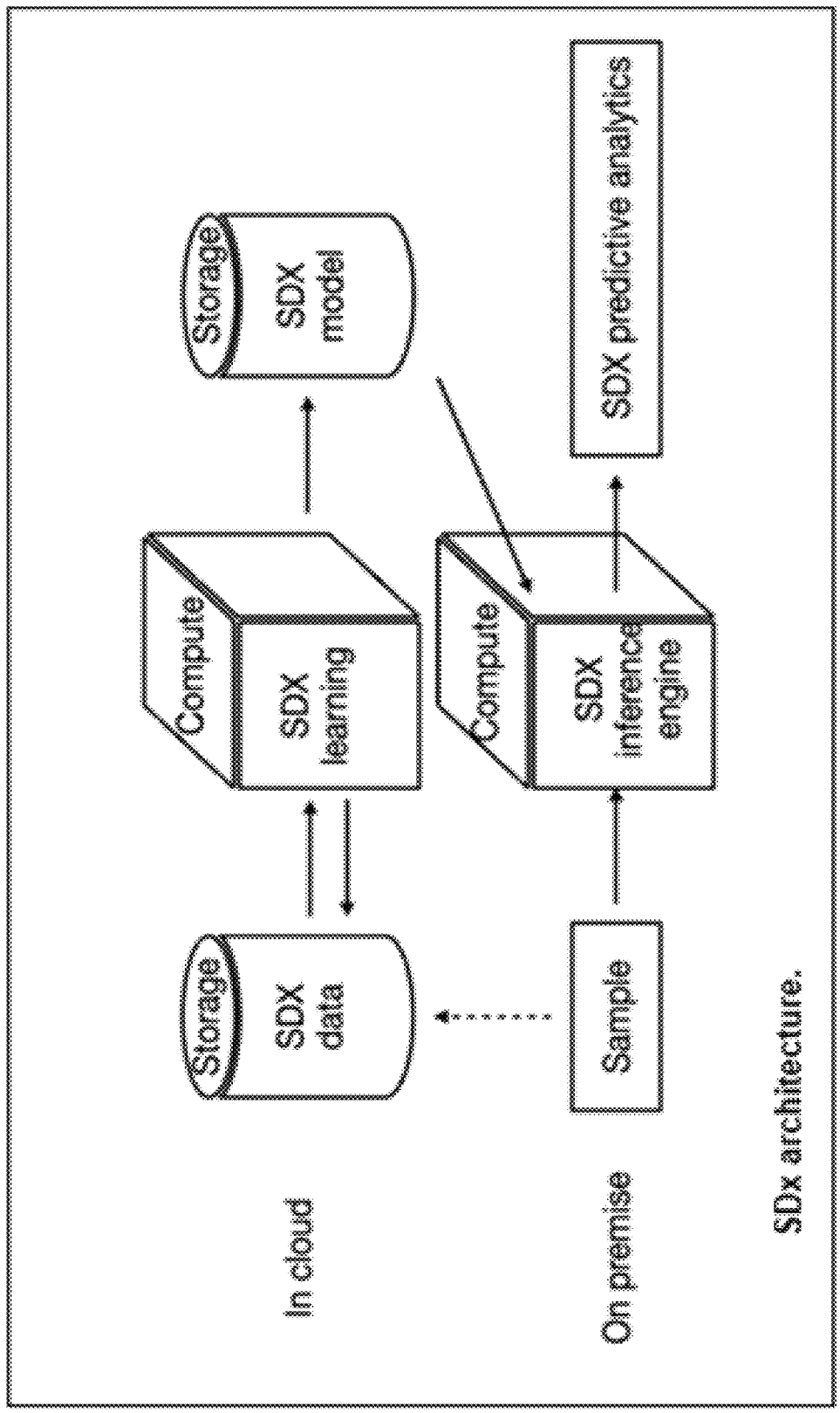
FIG. 5 shows an exemplary system architecture.

Platform architecture: Integration of the AI/ML processes into the general system architecture is shown in FIGS. 1 and 5. In some embodiments, the inference process is automatically triggered the moment new data populates the digital repository, effectively translating raw data into a pre-defined set of deliverables, such as pathogen discovery & identity, relative abundance, co-infections, location within a phylogenetic tree, antibiotic resistance, presence of toxin encoding genes, etc. The inclusion of historical and routine genomic surveillance data linked to epidemiological data within the repository allows for establishing the timeline for pathogen emergence. Many more analytical parameters than those mentioned herein can be computed in an automated fashion.

References (Cho & Yoon, 2014): Cho Y I, Yoon K J. An overview of calf diarrhea-infectious etiology, diagnosis, and intervention. J Vet Sci. 2014;15 (1): 1-17. doi: 10.4142/jvs.2014.15.1.1. Epub 2013December 27. PMID: 24378583; PMCID: PMC3973752.

(Ferreira, et al. 2021): Ferreira R L U, Sena-Evangelista K C M, de Azevedo E P, Pinheiro F I, Cobucci R N and Pedrosa L F C (2021) Selenium in Human Health and Gut Microflora: Bioavailability of Selenocompounds and Relationship With Diseases. Front. Nutr. 8:685317. doi: 10.3389/fnut.2021.685317

(Peixoto, et al. 2021): Peixoto R S, Harkins D M, Nelson K E. Advances in Microbiome Research for Animal Health.

Annu Rev Anim Biosci. 2021 Feb. 16;9:289-311. doi: 10.1146/annurev-animal-091020-075907. Epub 2020 Dec. 14. PMID: 33317323.

(Rybak, et al. 2022): Rybak B, Krawczyk B, Furmanek-Blaszk B, Wysocka M, Fordon M, Ziolkowski P, Meissner W, Stepniewska K, Sikorska K. Antibiotic resistance, virulence, and phylogenetic analysis of Escherichia coli strains isolated from free-living birds in human habitats. PLOS One. 2022 Jan. 12;17 (1): e0262236. doi: 10.1371/journal.pone.0262236. PMID: 35020771; PMCID: PMC8754294.

We claim:

1. A method comprising:
   a) obtaining a non-human animal sample and sample metadata associated with said non-human animal sample, said sample metadata including demographic information, health information, and environmental information, wherein said environmental information includes presence of same-species animals, density of same-species animals, and/or presence of different-species animals;
   b) conducting a multiplex assay on nucleic acid molecules obtained from said sample to identify nucleic acid sequence information from a plurality of microorganisms and viruses and generate a molecule signature; and
   c) generating a health report based on said molecular signature and said sample metadata with using an artificial intelligence and machine learning (AI/ML) system, wherein said health report includes identities of one or more disease-causative microorganisms and viruses and provides a preventative or interventional approach.

2. The method of claim 1, wherein said generating a health report based comprises use of a computer processor running software that manages one or more aspects of said obtaining a non-human animal sample and sample metadata, conducting a multiplex assay, identifying nucleic acid sequence information, and/or generating a heath report.

3. The method of claim 2, wherein said processor controls one or more hardware devices involved in said obtaining, conducting, identifying, and/or generating.

4. The method of claim 2, wherein said processor tracks one or more or each of: a sample acquisition kit request, sample acquisition kit shipment, sample acquisition kit delivery, sample acquisition kit receipt, sample acquisition kit return, sample acquisition kit shipment status, sample storage, sample archiving, sample splitting, sample entry into a processing system, sample status in a processing system, and sample processing completion.

5. The method of claim 2, wherein said processor collects or receives said sample metadata.

6. The method of claim 2, wherein said processor collects data derived from said generating step.

7. The method of claim 6, wherein said data is nucleic acid sequence data.

8. The method of claim 2, wherein said processor generates a hypercube from sample-derived data points.

9. The method of claim 8, wherein said processor automatically performs analytical analysis on the hypercube.

10. The method of claim 2, wherein said analyzing comprises inferring relationships between data obtained in said generating step.

11. The method of claim 2, wherein said analyzing comprises inferring relationships between data obtained in said generating step and said sample metadata.

12. The method of claim 11, wherein said stake holder is an entity that develops and/or manufactures therapeutic or preventative agents.

13. The method of claim 12, wherein said therapeutic or preventative agents comprise vaccines or antibiotics.

14. The method of claim 2, wherein said processor automatically generates phylogenetic trees for all microorganisms and/or viruses found in said sample, relative to previously known variants of microorganisms and viruses.

15. The method of claim 2, wherein said processor calculates an RO of all pathogens found in said sample.

16. The method of claim 2, wherein said processor catalogs co-infections identified in said sample.

17. The method of claim 2, wherein said processor calculates a risk factor for an animal from which the sample originated.

18. The method of claim 2, wherein said processor calculates a risk factor for one or more animals in proximity to an animal from which the sample originated.

19. The method of claim 2, wherein said processor generates a spatial map of data points and their time derivatives.

20. The method of claim 2, wherein said processor identifies a region of said sequence information from said plurality of microorganisms and viruses that encodes a peptide or nucleic acid that is a target for therapeutic intervention.

21. The method of claim 20, wherein said therapeutic intervention comprises an mRNA vaccine.

22. The method of claim 2, wherein said processor identifies markers indicative of genetic manipulation and/or antimicrobial resistance.

23. The method of claim 2, wherein said processor generates a database comprising said molecular signature, said sample metadata, and correlations there between.

24. The method of claim 2, wherein said processor uses said AI/ML system to assign mathematical weights to said sample metadata.

25. The method of claim 24, wherein said processor utilizes said mathematical weights to generate a health prediction that is provided in said health report.

26. The method of claim 1, wherein said demographic information comprises information selected from the group consisting of age, birth date, number of siblings, gender, species, sub-species, breed, coloring, weight, birth weight, height, and length.

27. The method of claim 1, wherein said health information comprises information selected from the group consisting of disease history, vaccination status, medication history, antibiotic history, pregnancy history, allergies, injury history, behavioral abnormalities, medical test history, medical procedure history, diet, nutritional supplement history, and growth history.

28. The method of claim 1, wherein said environmental information further comprises information selected from the group consisting of geography, historical geography, air quality, water quality, soil quality, weather, exposure to disease vectors, proximity to disease vectors, exposure to radiation, time spent outdoors, time spent indoors, feeding conditions, forest coverage, fertilizer exposure, sewage conditions, exposure to emissions, and slaughter conditions.

29. The method of claim 1, wherein said AI/ML system is previously trained on said sample metadata and said molecular signatures.

30. The method of claim 1, further comprising a step of treating an animal from which the sample was derived with a therapeutic agent or preventative.

31. The method of claim 1, wherein said preventative or interventional approach comprises a vaccine, an antiviral, or an antibiotic.

32. The method of claim 31, wherein the vaccine is an mRNA vaccine.

33. The method of claim 1, further comprising a step of disseminating said health report to a stake holder.

* * * * *